United States Patent
Morris

(10) Patent No.: US 7,311,958 B2
(45) Date of Patent: Dec. 25, 2007

(54) PADDED CORNER COVERS

(76) Inventor: Aubrey J. Morris, 1005 Summer Point, Norman, OK (US) 73071

( * ) Notice: Subject to any disclaimer, the term of this patent is extended or adjusted under 35 U.S.C. 154(b) by 310 days.

(21) Appl. No.: 10/926,356

(22) Filed: Aug. 26, 2004

(65) Prior Publication Data

US 2006/0046021 A1    Mar. 2, 2006

(51) Int. Cl.
*B32B 1/00*    (2006.01)
(52) U.S. Cl. .................. 428/80; 428/99; 248/345.1; 108/90
(58) Field of Classification Search .......... 428/80, 428/99, 119; 248/345.1; 108/90
See application file for complete search history.

(56) References Cited

U.S. PATENT DOCUMENTS

| | | |
|---|---|---|
| 3,030,728 A | 4/1962 | Wesman |
| 3,041,775 A | 7/1962 | Brown, Jr. et al. |
| 3,150,854 A | 9/1964 | Jamieson |
| 3,717,968 A | 2/1973 | Olsen et al. |
| 3,725,188 A | 4/1973 | Kalt |
| 3,922,408 A | 11/1975 | Smith |
| 3,960,354 A | 6/1976 | Simikoski |
| 4,012,878 A | 3/1977 | Ellingson |
| 4,072,231 A | 2/1978 | Helms |
| 4,742,916 A | 5/1988 | Galea |
| 4,787,366 A | 11/1988 | Bell |
| 4,817,902 A | 4/1989 | Mason |
| 5,065,972 A | 11/1991 | Buckshaw et al. |
| 5,149,575 A | 9/1992 | Soifer |
| 5,208,084 A | 5/1993 | Rutz |
| 5,322,257 A | 6/1994 | Verderose et al. |
| 5,496,609 A | 3/1996 | Michelstein |
| 5,508,078 A | 4/1996 | Stalnaker |
| 5,639,072 A | 6/1997 | McCall |
| 6,019,336 A | 2/2000 | Havens |
| 6,044,774 A | 4/2000 | Gelbart |

*Primary Examiner*—Alexander S. Thomas
(74) *Attorney, Agent, or Firm*—Richard C. Litman

(57) ABSTRACT

A padded corner bumper comprises an elongated core formed of a cushioning material, an outer decorative cover formed of vinyl-coated fabric, and a backing material formed of polypropylene mesh. The core has a front, a back coextensive with the front, and a continuous side edge extending between the top and bottom. The outer decorative cover and backing material are stitched together to form a casing that completely surrounds the core, the backing being positioned only over the back of the core. The padded corner bumper is sufficiently flexible to allow it to wrap around an outside corner created by two mutually perpendicular surfaces. The corner bumper has a non-uniform horizontal cross section perpendicular to the axis. For three-sided corners, a top cushion is attached to a second side cushion that wraps around the vertical edge.

2 Claims, 7 Drawing Sheets

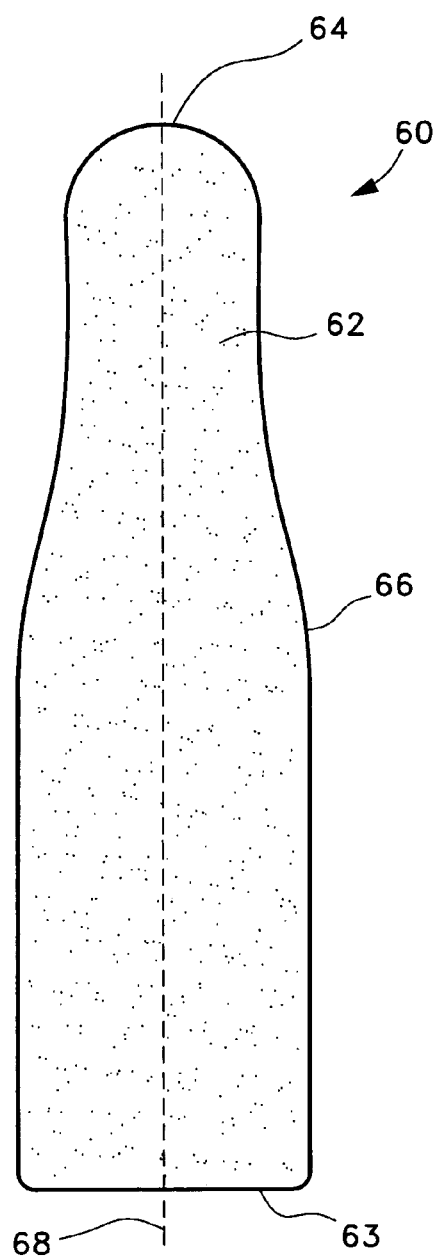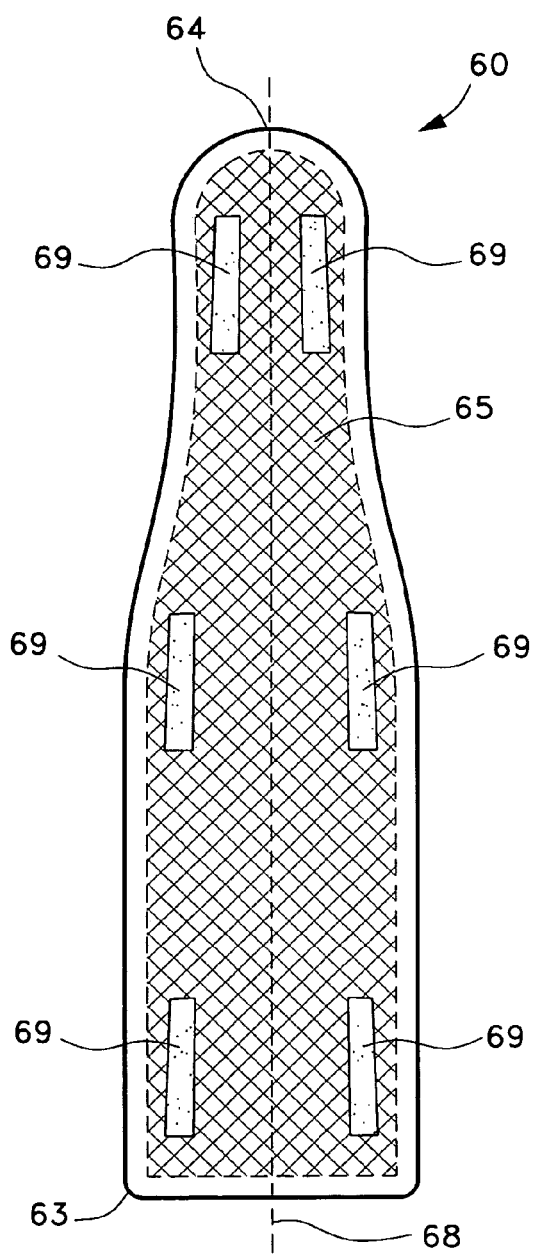
Fig. 10
Fig. 11

PADDED CORNER COVERS

BACKGROUND OF THE INVENTION

1. Field of the Invention

The present invention relates to safety devices to protect children and individuals with impaired equilibrium from sharp corners found in ordinary living environments. More particularly, the present invention relates to padded corner covers that can be attached to the corners of walls, furniture, etc.

2. Description of the Related Art

For the purposes of this document, the term, "corner" shall refer to an outside corner created by two generally planar surfaces coming together at a line, referred to herein as a "two-sided corner" or three planar surfaces coming together at a point, referred to herein as a "three-sided". The planar surfaces are not necessarily perpendicular to each other.

It is commonly known and understood that sharp corners on furniture or walls pose a risk to small children. Such exposed corners also pose a risk to adults with balance disorders, generally related the inner ear such as Labyrinthitis/vestibular neuritis or Menière's disease. Dizziness can also be caused by migraine headaches, reduced blood flow to the inner ear, and some drugs, e.g., taken for hypertension. There are many other reasons an adult can suffer from dizziness which can pose other health hazards.

To reduce the risk to children and adults posed by sharp corners, it is desirable to provide some sort of padding over the sharp corners. The art of padded corner covers is crowded with various devices and systems for protecting children from sharp corners found in many living environments. Unfortunately, these prior art devices suffer from deficiencies in terms of aesthetics, reusability, and ability to be easily cleaned, and therefore have not been successful.

For example, U.S. Pat. No. 3,030,728, issued Apr. 24, 1962 to Wesman, shows cushioning corner pieces formed of a resilient material such as rubber, polyvinyl plastic, a foam-type plastic (col. 2, lines 17-19), or foam rubber that may be covered with fabric, leather, plastic, or rubber (col. 3, lines 25-32). This device comprises a number of complex elements including a top element, two side elements, and a plurality of vertically spaced bottom elements, each formed of a complex shape having a plurality of grooves for the purpose of gripping or retaining, by suction, the corner piece onto the corner. It is labor intensive to install (col. 2, lines 62-col. 3, line 15) and is not very aesthetically pleasing.

U.S. Pat. No. 3,041,775, issued Jul. 3, 1962 to Brown, Jr., et al., shows a molded corner pad made from cushioning material such as foam rubber or plastic. The device may be manufactured in different colors or be enclosed in a fabric or other material. However, foam rubber is difficult to clean and there is no explanation as to how the foam rubber is covered in fabric so that the fabric stays in place when in use, but does not come apart when being cleaned. Furthermore, the device is not sufficiently durable for extended use.

U.S. Pat. No. 3,150,854, issued Sep. 29, 1964 to Jamieson, discloses a safety device readily mountable temporarily on exposed corners to remove hazards to infants, children, elderly, and other persons moving about such exposed objects. The device is molded from soft rubber or soft resilient thermoplastic materials such as polyvinyl chloride and polyethylene. It is attached to furniture by pressure sensitive adhesive. This device protects only the very corner using a bulbous projection. It is not sufficiently padded and may be considered unsightly.

U.S. Pat. No. 3,717,968, issued Feb. 27, 1973 to Olsen et al., shows a surface-mounted wall guard that is permanently attached to an external wall corner for protecting the corner from damage caused by accidental impact. While this device may provide some protection to individuals who run or fall into it, it is primarily designed to protect the wall corner itself. Furthermore, it is a permanent installation, requiring nails or screws to hold it in place, which, when removed, would leave unsightly holes. While installed, the visible portion of the device protrudes slightly from the wall and has vertical edges which create an undesirable monolithic appearance.

U.S. Pat. No. 3,725,188, issued Apr. 3, 1972 to Kalt, discloses a heavy foam rubber shock absorbing material formed into a triangular pad for protecting table top corners. The pad thickness tapers in three directions along each of the planar surfaces forming the corner. It is attached using adhesive. This device, while unobtrusive, does not lend itself to the decor of the space in which it is utilized. It is difficult or impossible to clean and reuse and is not very durable, due to the material from which it is made.

U.S. Pat. No. 3,922,408, issued Nov. 25, 1975 to Smith, discloses an edge and corner protector formed of porous foam material of plastic or rubber with a non-porous skin or outside cover. It is attached to the edge or corner by pressure sensitive adhesive. The foam padding is visible, unsightly, and not very durable. If used on a kitchen countertop as suggested, it could absorb moisture and become moldy.

U.S. Pat. No. 3,960,354, issued Jun. 1, 1976 to Simikoski, shows a furniture corner protector that uses a plurality of spacer blocks to form up a rounded corner around which impact absorbing material, such as polystyrene foam, is provided. It is attached by adhesive or elastic band that stretches completely around the table top. It extends table edges on all sides, is complex to install, is not easily cleaned, and is unsightly.

U.S. Pat. No. 4,012,878, issued Mar. 22, 1977 to Ellingson, shows an extruded wall corner guard having an inner and outer resilient layer spaced by an air gap. The inner layer is attached to the wall surfaces by adhesive coating and/or screws (col. 2, lines 21-24). The device is intended to protect the corners from wheeled vehicles commonly used in hospital environments (col. 2, lines 6-10). The device may extend the full height of the wall or less (col. 2, lines 26-29). Because this device is extruded, the cross section taken horizontally is constant, giving the device a monolithic look which may be seen as undesirable. It would not blend with the decor of most homes.

U.S. Pat. No. 4,072,231, issued Feb. 7, 1978 to Helms, shows a corner protector constructed from a flexible, rubber like substance (col. 3, lines 3-4) for the purpose of either protecting the corner of an article of furniture from damage, or for protecting children from being hurt by the corner (col. 1, lines 5-10). It is attached either by a suction cup applying negative pressure to a portion of the top surface of the article furniture, or double-sided foam tape (col. 3, lines 5-15). Merely using a suction cup is not likely to sufficiently retain the device in place. Since the device is not upholstered, it is not likely to blend into the decor of most homes.

U.S. Pat. No. 4,742,916, issued May 10, 1988 to Galea, shows a device formed from molded pulp for protecting corners of an article against impact during shipping. The device spaces the article from an outer container; there is no provision for attaching the device to the article, nor is any attempt made to make the device attractive. U.S. Pat. No. 4,787,366, issued Nov. 29, 1988 to Bell, shows a quilted fireplace hearth cover. This device is not suitable for most furnishings, is not suitable for many decors, and must be made to custom dimensions.

U.S. Pat. No. 4,817,902, issued Apr. 4, 1989 to Mason, discloses table top corner protectors comprising an inner core shaped from resilient material such as polystyrene foam, foam rubber, or other similar soft material. The inner material is held in place by adhesive or hook-and-loop fastener (such as that sold under the trademark "VELCRO"). An outer cover comprises a cloth or flexible material to form a mitt which conforms to the outer shape of the core (col. 3, lines 29-50). A pair of draw strings secures the outer cover against the core. The outer cover may be made of any color to go with any decor of a particular home (col. 4, lines 45-46). Unfortunately, the device is secured, either directly or via the hook-and-loop fastener, or using adhesive attached to the polystyrene foam or foam rubber core. Foam rubber does not have sufficient integrity to firmly attach to the adhesive while polystyrene foam is not resilient and may not provide adequate protection.

U.S. Pat. No. 5,065,972, issued Nov. 19, 1991 to Buckshaw et al., discloses a corner bumper formed of polyvinyl chloride which attaches to the furniture surface using reusable adhesive that can be protected between uses by a removable paper backing. The device provides inadequate padding directly above the corner (see FIG. 2 of Buckshaw) and therefore will not protect an individual who falls onto the corner. Furthermore, the vinyl material cannot be upholstered and may not lend itself to a particular home's décor.

U.S. Pat. No. 5,149,575, issued Sep. 22, 1992 to Soifer, discloses a corner bumper having a cylindrical arch extending around the vertical edge of a corner of an article of furniture. This device provides inadequate protection for the case where an individual falls down on the top of the corner. Furthermore, the gap between the corner and the arch is visible (see, FIGS. 1 and 2 of Soifer), which affect the overall aesthetics of the device. Since it cannot be upholstered, it may not blend well with a particular home's décor.

U.S. Pat. No. 5,208,084, issued May 4, 1993 to Rutz, discloses a padded arm and wrist support for typists and other office workers. The pad comprises a rigid frame to which a cushioning material is glued. A covering such as leather or a vinyl-coated fabric, such as that sold under the trademark "NAUGAHYDE", or similar material, wraps around and is glued to the frame and cushioning, but does not overlap. Adhesive is mounted directly to the frame portion (at an opening in the covering) and glued to the top surface of a desk. (See col. 1, lines 48-60 and col. 2, lines 52-57.) The use of a rigid frame allows the device to be used without adhesive, in which case it simply rests on the top surface of a desk or counter (col. 2, lines 58-60). However, for the purposes of child safety and aesthetics, it would be better to allow the cushioning material to conform somewhat to the corner. For example, if the corner is already slightly rounded off, the angle iron frame takes that advantage away. Furthermore, Rutz does not disclose a porous backing material, which would allow for air to escape when the cushion is compressed.

U.S. Pat. No. 5,322,257, issued Jun. 21, 1994 to Verderose et al., shows a corner protector intended to protect a person's feet from bed legs and corner structures. The protector comprises a first and a second cushioned wall disposed orthogonally to one another, and a flexible web spanning a bottom wall of each corner wall to accommodate a furniture leg thereon (col. 1, lines 44-49). This device is not suitable for cushioning tabletops, since it only protects on two sides and cannot be used with wall corners because the web would interfere.

U.S. Pat. No. 5,496,609, issued Mar. 5, 1996 to Michelstein, discloses a protective bumper intended to be applied around the complete perimeter of a tabletop. It comprises an outer shell formed of vinyl or thin wall vinyl that is readily deformable but hard enough to resist abuse and abrasion. The shell is filled with soft resilient foam. The shell is cylindrical except on one side where it is closed on a planar side by a layer of adhesive foam. (See col. 2, lines 36-49.) This device will not prevent injury if a child's head or other body part comes down on a furniture corner. Furthermore, it is not suitable for wall corners since it only covers a single side, not both wall surfaces at the corner.

U.S. Pat. No. 5,508,078, issued Apr. 16, 1996 to Stalnaker, discloses a wall or tabletop corner pad that is moldable to any shape due to a ductile inner core formed of wire mesh, such as chicken wire. Around this inner core is a quilted, cushioned pad, which is attachable to the corner by hook-and-loop strips. This device extends too far away from the wall and is monolithic in appearance.

U.S. Pat. No. 5,639,072, issued Jun. 17, 1997 to McCall, discloses a cylindrical cushion with a 90° section removed for attaching to a corner, such as the edge of a tabletop. The cushion is formed from high density plastic foam, such as polyester foam. A cover (material not specified) encloses the foam core and hook and loop fasteners attach it to a tabletop edge. This device is not suitable for table corners and is does not provide sufficient protection for wall corners. Since it is generally cylindrical, it does not have sufficient surface area to maintain its position if used on a wall. It would be too easy for a person to brush past it, causing it to tear away from the wall.

U.S. Pat. No. 6,019,336, issued Feb. 1, 2000 to Havens, describes a corner guard similar to the '072 device, but which is a slightly deformed cylinder and is intended as an arm or wrist rest for workstations. The cushion includes an elongated foam cushion having a 90° cut-out. The cushion is formed of polyurethane foam and is covered with a skin of flexible material, such as urethane elastomer, vinyl, or a thermoplastic elastomer that provides resistance to cuts and normal wear and tear. A double-sided adhesive film removably attaches the device to the edge of a table or desk formed by the top and one side. This device is not suitable to protect the corner of a tabletop, nor does it provide sufficient protection for a wall corner.

U.S. Pat. No. 6,044,774, issued Apr. 4, 2000 to Gelbart, discloses a tabletop corner protection system having a pad for each corner held in place by strings tying adjacent corners together. Looking at FIG. 4 of Gelbart, it appears that it provides reduced padding at the corner, where it is most needed.

None of the above inventions and patents, taken either singly or in combination, is seen to describe the instant invention as claimed. Thus padded corner covers solving the aforementioned problems is desired.

SUMMARY OF THE INVENTION

The padded corner covers of the present invention have an elongated core formed of a cushioning material, an outer decorative cover formed of vinyl-coated fabric, and a backing material formed of polypropylene mesh. The core has a front, a back coextensive with the front, and a continuous side edge extending between the top and bottom. The outer decorative cover and backing material are stitched together to form a casing that completely surrounds the core, the backing being positioned only over the back of the core. The padded corner cover is sufficiently flexible to allow it to wrap around an outside corner created by two mutually perpendicular surfaces. The corner cover has a non-uniform horizontal cross section perpendicular to the axis. For three-sided corners, a top cushion is attached to a second side cushion that wraps around the vertical edge.

These and other features of the present invention will become readily apparent upon further review of the following specification and drawings.

BRIEF DESCRIPTION OF THE DRAWINGS

FIG. 10 is a front elevation view of an alternative corner bumper.

FIG. 11 is a back view of the corner bumper of FIG. 10.

Similar reference characters denote corresponding features consistently throughout the attached drawings.

DETAILED DESCRIPTION OF THE PREFERRED EMBODIMENTS

Figure 1A:
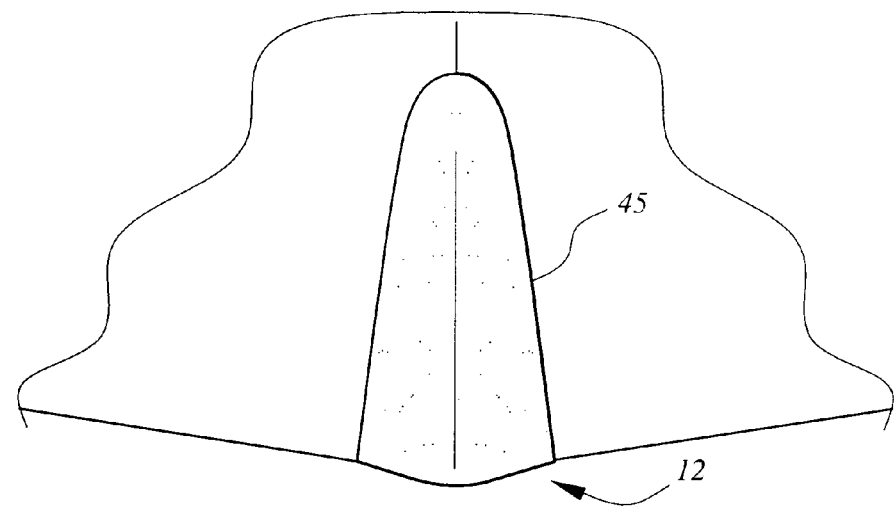
FIG. 1A is an environmental, perspective view of a padded corner cover (bumper) utilized on a wall corner.
Figure 1B:
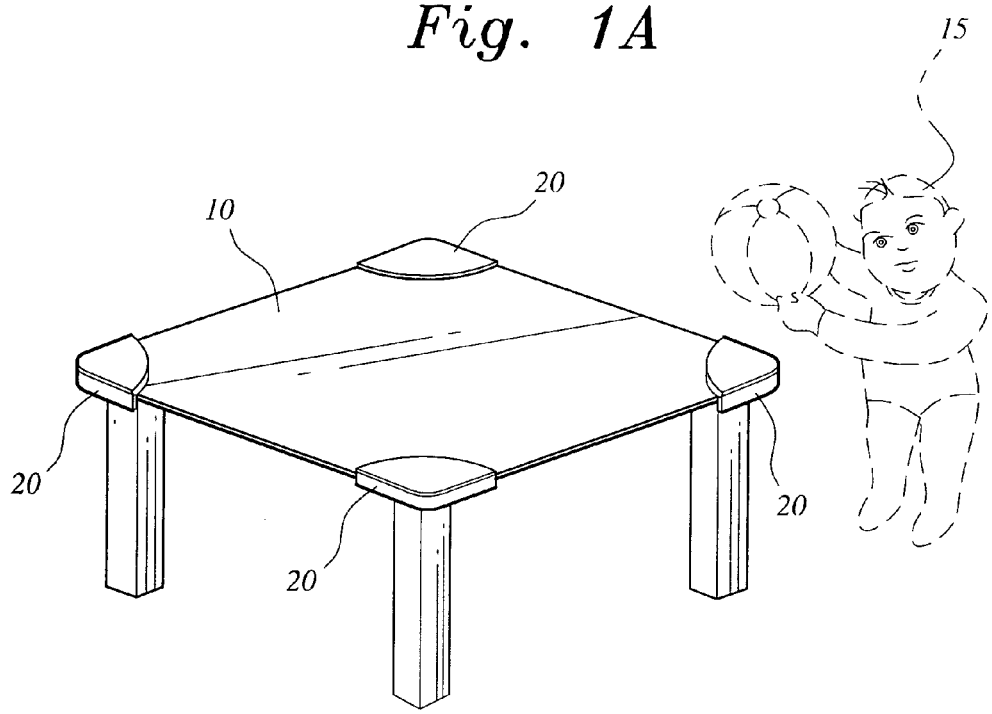
FIG. 1B is an environmental, perspective view of padded corner covers (bumpers) utilized on a coffee table.

FIGS. 1A and 1B show a typical living environment where a child 15 maybe found playing. In the environment of FIG. 1B is a coffee table 10 that has four sharp corners covered with exemplary bumpers 20. In FIG. 1A, a wall corner 12 is protected by a wall bumper 45. It is apparent that child 15 is much safer playing with his ball where sharp corners typically found in a living environment are protected with bumpers 20, 45.

Figure 2:
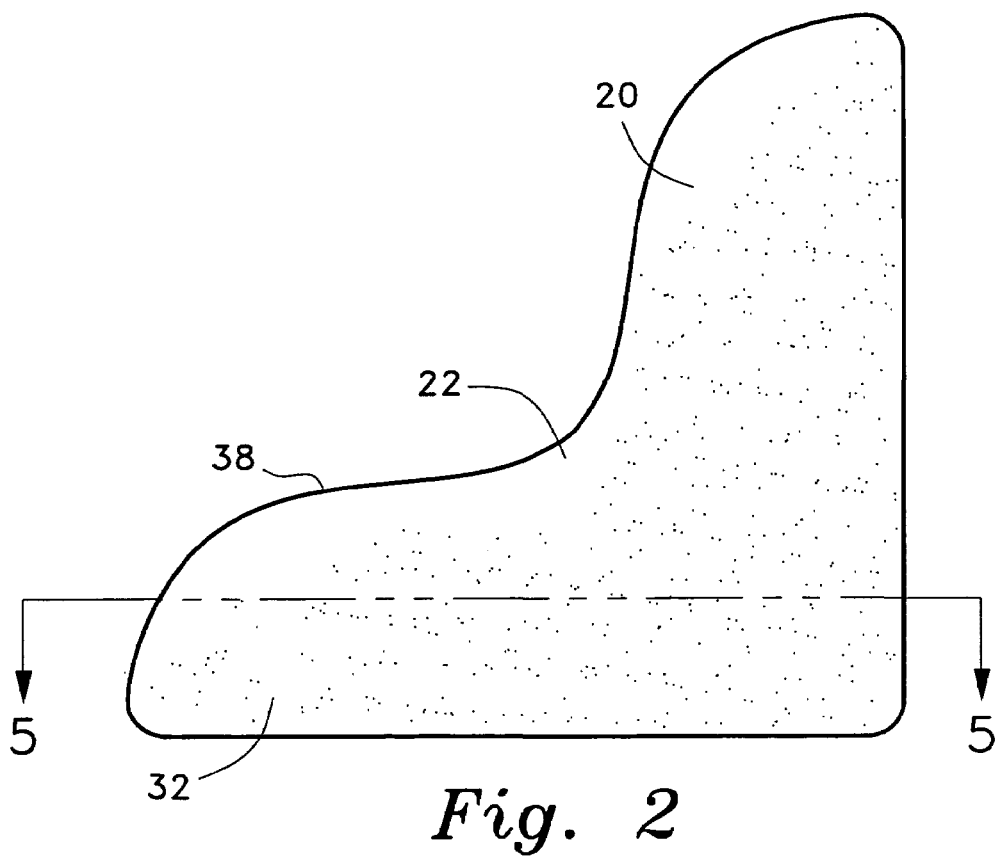
FIG. 2 is a top view of an exemplary three-sided corner cover according to the present invention.
Figure 3:
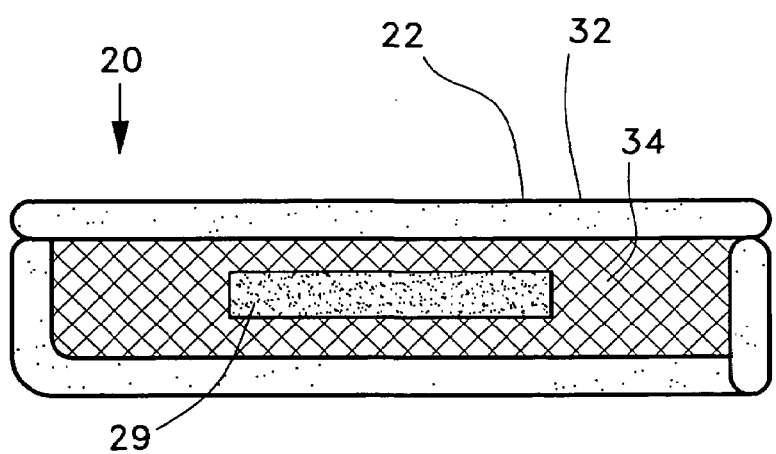
FIG. 3 is a left side view of the corner cover of FIG. 2.
Figure 4:
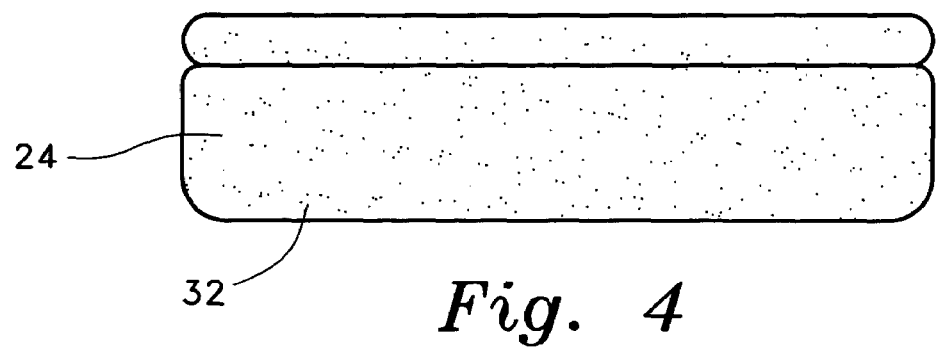
FIG. 4 is a front view of the corner cover of FIG. 2.
Figure 5:
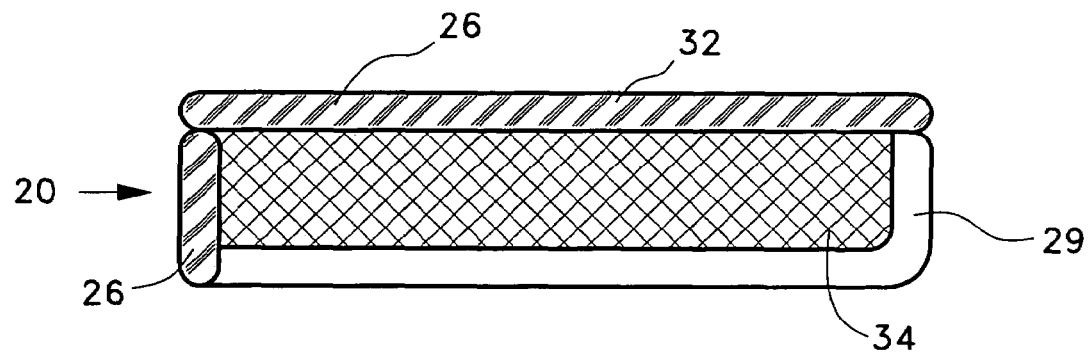
FIG. 5 is a section view taken along lines 5-5 of FIG. 2.
Figure 6:
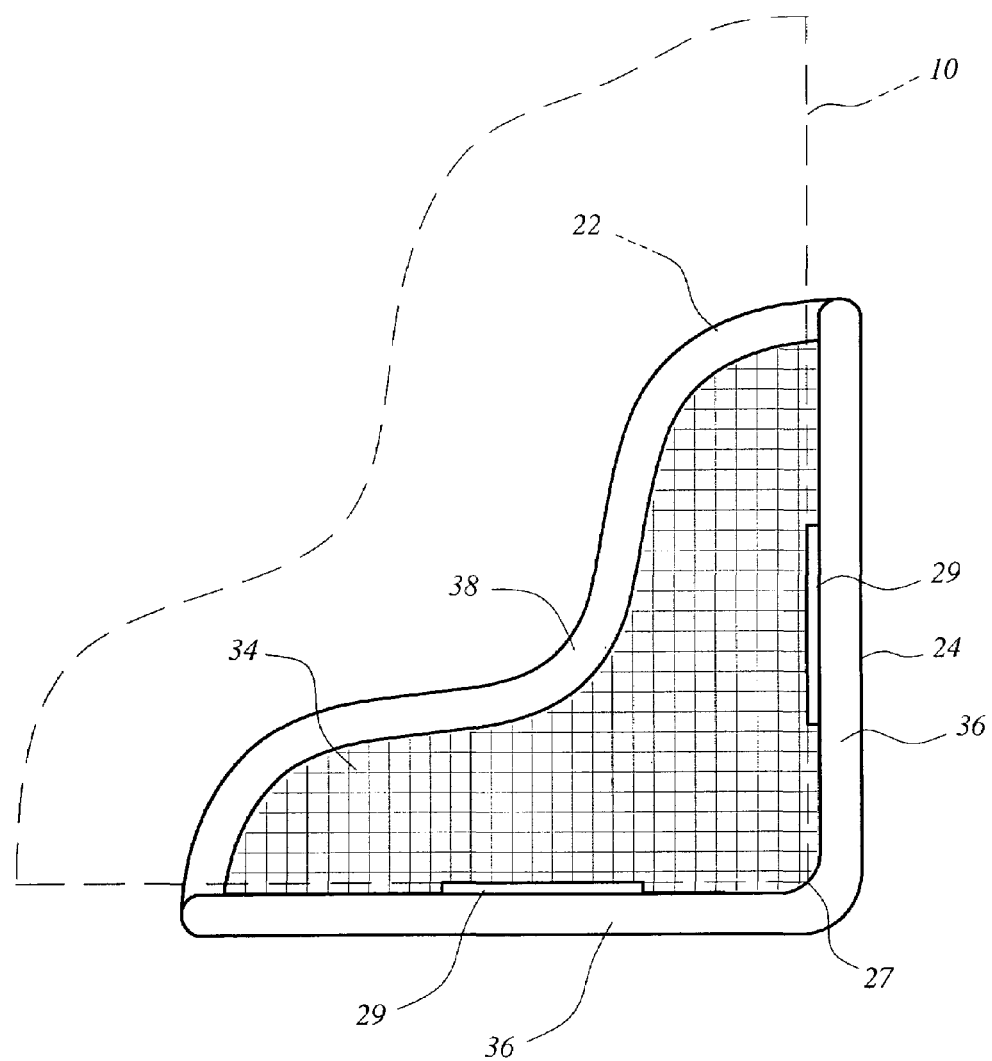
FIG. 6 is a bottom view of the corner bumper of FIG. 2 shown with a table top shown in phantom.

FIGS. 2, 3, 4, 5, and 6 show the construction of an exemplary three-sided corner bumper 20. FIGS. 2, 3, and 4 show plan, side, and front views, respectively, of corner bumper 20. FIG. 5 shows a cross section view taken along line 5-5 of FIG. 2. FIG. 6 shows a bottom view of the corner bumper looking up through a table 10 showing the under side of corner bumper 20.

Corner bumper 20 comprises a top cushion 22 and a side cushion 24. Top cushion 22 covers the corner area of a horizontal side of a three-sided corner, such as commonly formed by household furniture, and has two edges 36 that extends slightly over two side edges of the horizontal surface forming the corner. A third edge 38 has a decorative serpentine shape but allows sufficient width to provide adequate protection. Side cushion 24 is attached to and depends from the top cushion, covering the two vertical sides forming the three-sided corner. Note that side cushion 24 wraps around the vertical edge 27 formed at the intersection of the two vertical walls (FIG. 6).

Each cushion 22, 24 comprises a core 26 (FIG. 5) comprising a cushioning material such as closed-cell resilient ethylene foam or cotton batting. Other protective or cushioning materials such as would occur to a person having ordinary skill in the art are also contemplated. For example, recycled polyurethane foam, such as that commonly used to make carpet padding, may be used.

Cushions 22, 24 may be from a half inch (3 cm) to one inch (2.6 cm) thick. Other thicknesses may be desirable depending upon the environment of use. For example, if implemented in an area such as a gymnasium where sporting activities are anticipated, thicker cushioning may be desired.

Around each core 26 is a decorative covering 32 and backing material 34. Decorative covering 32 preferably comprises a strong, durable, non-porous material that is easily cleaned and maintained in a like new condition. For example, a vinyl-coated fabric such as that sold under the trademark "NAUGAHYDE" or other imitation leather material is contemplated. Alternatively, upholstery fabric such as that used for couches and pillows may be used to match existing upholstery in the room intended for use.

Backing material 34 faces the furniture surface and is not normally seen during use. Preferred backing materials are durable, cleanable and porous, to allow air to escape when the cushion is compressed. An exemplary material would be polypropylene mesh such as that used to make trampolines. The backing material 34 and decorative covering 32 are stitched together to form a casing that surrounds core 26.

FIGS. 3 and 6 shows hook-and-loop fasteners 29, such as that sold under the trademark, "VELCRO" sewn to backing material 34 of side cushion 24 for releasably attaching same to two vertical sides of a three-sided corner. Non-marring adhesive is used to attach the one part of the hook-and-loop fastener 29 to vertical sides of table 10. Thus, when corner bumper 20 is removed, the entire surface of the table top is available and hook-and-loop fasteners will be unobtrusive. Note that use of hook-and-loop fasteners are optional; simple reusable adhesive "tack" or other means may be used to secure corner bumper 20 to table 10. Alternatively, corner bumper 20 may simply rest on each corner of a flat surface.

Figure 7:
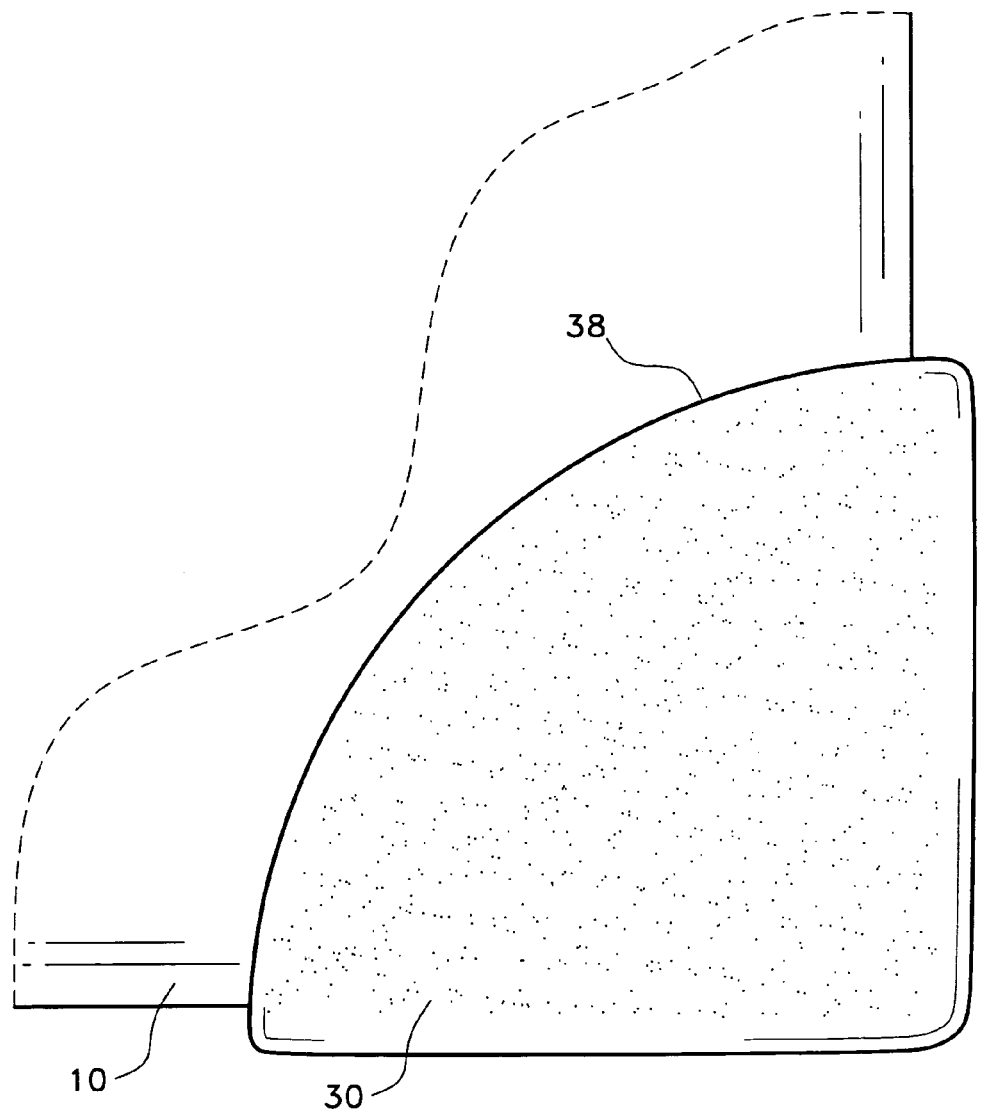
FIG. 7 is a plan view of an alternative furniture corner bumper having a convex third side of the top cushion.

FIG. 7 shows an alternative embodiment of a corner bumper 30 in which the third edge 38 of top cushion 24 is convex. This shape is quite decorative as seen in FIG. 1 and is provides sufficient surface area that it can double as a coaster. Third edge 38 can also be straight or have other decorative shapes without affecting the functionality of corner bumper 30.

Figures 8, 9:
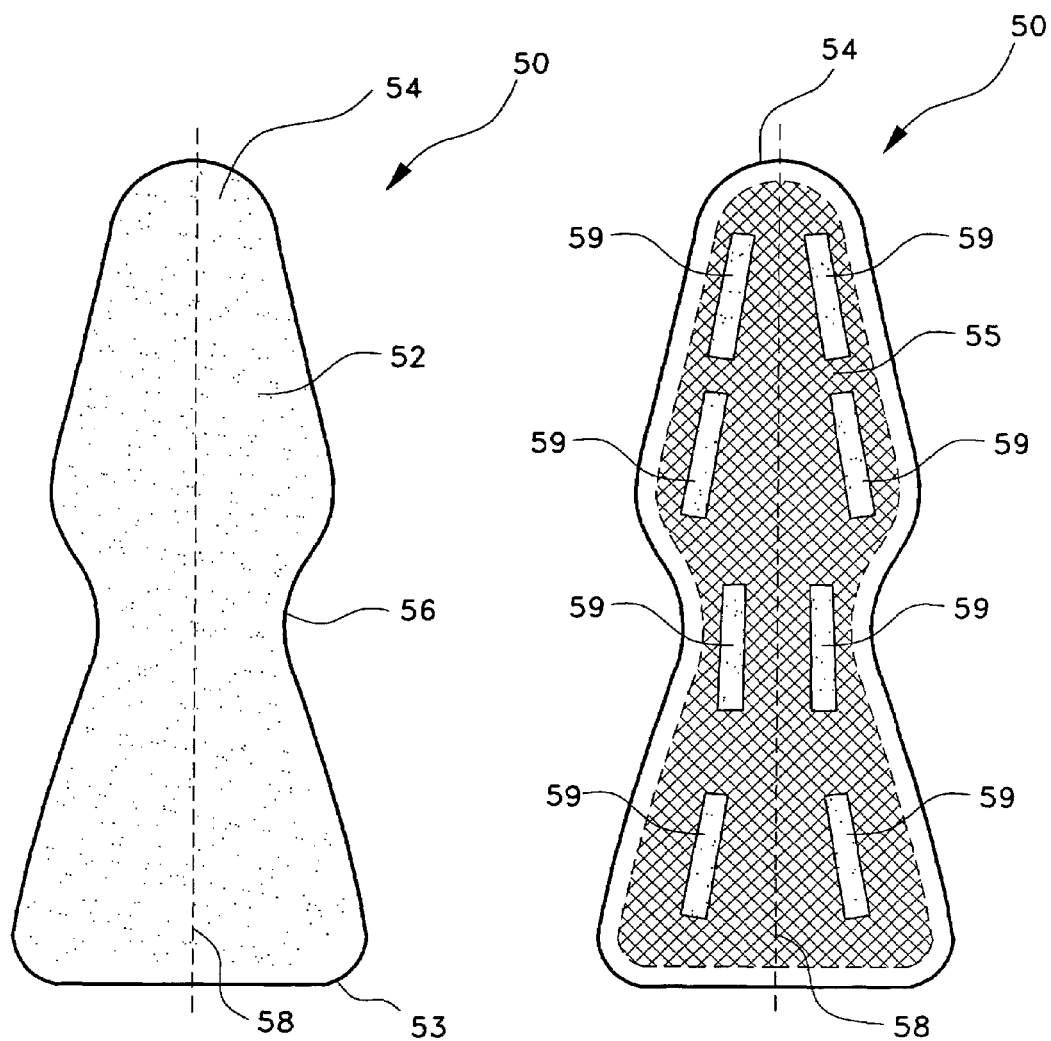
FIG. 8 is a front elevation view of an exemplary wall corner bumper for two-sided corners.
FIG. 9 is a back view of the corner bumper of FIG. 8.

FIGS. 8 and 9 show front and back views, respectively, of an exemplary wall corner bumper comprising a cushion 56 for protecting individuals from two-sided corners commonly formed by walls. Wall corner bumper 50 comprises a single cushion 56 having an outer decorative covering 52 formed of a decorative, durable, non-porous and cleanable material such as vinyl-coated fabric such as that sold under the trademark, "NAUGAHYDE" while backing 55 comprises a durable cleanable porous material such as polypropylene mesh of the type commonly used to make trampolines. Encased in outer decorative covering 52 and backing 55 is a cushion of the type described above with respect to FIG. 6. The cushion should be capable of absorbing and cushioning impacts against the wall corner. Exemplary materials are closed cell resilient ethylene foam or cotton batting. Several strips of hook-and-loop fasteners 59 are provided for attaching wall corner bumper 50 to a wall corner as shown in FIG. 1. In this case, wall bumper 50 is bent at a right angle at line 58 to therefore wrap around the wall corner.

Wall corner bumper is thus formed of a single cushion that wraps around the corner therefore accommodating any angle two-sided corner. It is also sufficiently wide that it can protect a projecting wall end or post. Where the intention is to provide protection for small children, wall corner bumper 50 may be about 3 feet (0.9 m) tall. However, for other applications, e.g., in an adult environment, the device may be 5 or 6 feet (1.5-1.8 m) tall.

Cushion 56 may be one-half inch (1.3 cm) to one inch (2.6 cm) thick or thicker, depending upon anticipated use. For ordinary living environments, it is anticipated that a half-inch thick cushion will be sufficient to prevent serious injury. However, if used in an environment such as a gymnasium where sporting activities are anticipated, a thicker cushion may be desired.

The shape of wall corner bumper 50 is non-monolithic: it has non-uniform horizontal cross section from the bottom to the top. This adds a decorative touch and presents many possibilities for different styles of wall corner bumpers. For example, wall corner bumper 50, shown in FIG. 8 is lava-lamp shaped, having lower portion 53 and an upper portion 54 that each include a sloping line leaning toward center line 58. This provides a decorative shape which is not possible by prior art wall bumpers due to their construction.

An alternative exemplary shape is shown at 60 in FIGS. 10 and 11. Wall corner bumper 60 in FIGS. 10 11 is bottle-shaped, having a rectangular bottom area 63 that tapers to a narrower "neck" portion near top 64. Note bumper 45 shown in FIG. 1 has a plain shape as would suit a more staid decor. While plain, it is not monolithic nor is it obtrusive to the environment.

It is to be understood that the present invention is not limited to the embodiments described above, but encompasses any and all embodiments within the scope of the following claims.

I claim:

1. A padded corner bumper, comprising:
    a first cushion comprising a core formed of a cushioning material, said core having a top, a bottom, a front, a back coextensive with said front, and a first edge and a second edge extending along intersecting lines, said first edge and said second edge extending generally perpendicularly between said top and said bottom; and
    a second cushion attached to said first cushion, said second cushion extending generally along two planes extending perpendicularly from said bottom and along said first and second edge, said second cushion wrapping around a corner formed at an intersection of said planes, said second cushion also comprising a core formed of a cushioning material, said core having a front and a back, said back being coextensive with said front, said front facing away from said first cushion;
    each said cushion further comprises an outer decorative cover formed of vinyl-coated fabric and a backing material formed of polypropylene mesh, said outer decorative cover and said backing material being stitched together to form a casing that completely surrounds said core, said backing material being positioned only over said back of said core;
    said padded corner bumper being sufficiently flexible to allow it to wrap around an outside corner created by two mutually perpendicular planar surfaces.

2. The padded corner bumper of claim 1 further comprising:
    a plurality of releasable fastening means fixed to said backing material for fastening said padded corner bumper to a wall corner.

\* \* \* \* \*